US011215362B2

(12) United States Patent
Watanabe et al.

(10) Patent No.: US 11,215,362 B2
(45) Date of Patent: Jan. 4, 2022

(54) FLAME DETECTION SYSTEM AND FLAME LEVEL DETECTION METHOD

(71) Applicant: AZBIL CORPORATION, Chiyoda-ku (JP)

(72) Inventors: Takashi Watanabe, Chiyoda-ku (JP); Shigeki Ishii, Chiyoda-ku (JP); Yuichi Kumazawa, Chiyoda-ku (JP); Kayo Suzuki, Chiyoda-ku (JP); Satoru Yamagishi, Chiyoda-ku (JP)

(73) Assignee: AZBIL CORPORATION, Chiyoda-ku (JP)

( * ) Notice: Subject to any disclaimer, the term of this patent is extended or adjusted under 35 U.S.C. 154(b) by 7 days.

(21) Appl. No.: 16/825,706

(22) Filed: Mar. 20, 2020

(65) Prior Publication Data

US 2020/0309372 A1 Oct. 1, 2020

(30) Foreign Application Priority Data

Mar. 29, 2019 (JP) ............................ JP2019-067097

(51) Int. Cl.
*G01J 1/42* (2006.01)
*F23N 5/08* (2006.01)
*G01J 5/00* (2006.01)

(52) U.S. Cl.
CPC ............. *F23N 5/082* (2013.01); *G01J 1/429* (2013.01); *G01J 5/0018* (2013.01)

(58) Field of Classification Search
CPC ......... F23N 5/082; G01J 1/429; G01J 5/0018; G01J 1/18; H01J 40/00; F23M 11/045
See application file for complete search history.

(56) References Cited

U.S. PATENT DOCUMENTS 3,493,753 A * 2/1970 Stowe .................... G08B 17/12
250/372

FOREIGN PATENT DOCUMENTS

JP 2005-083605 A 3/2005

* cited by examiner

*Primary Examiner* — Kiho Kim
(74) *Attorney, Agent, or Firm* — Oblon, McClelland, Maier & Neustadt, L.L.P.

(57) ABSTRACT

A flame detection system includes: a UV sensor that serves as a flame sensor detecting a UV ray generated by a flame; an application voltage generation unit that applies a driving voltage to the UV sensor; a discharge detection unit that detects a discharge in the UV sensor; a discharge count unit that counts the number of detected discharges; a discharge probability calculation unit that calculates a discharge probability on the basis of the number of discharges counted by the discharge count unit and the number of times the driving voltage is applied; a UV intensity determination unit that determines an intensity of the UV ray on the basis of the discharge probability; and a determination result output unit that outputs the intensity of the UV ray determined by the UV intensity determination unit via display or communication.

9 Claims, 3 Drawing Sheets

FLAME DETECTION SYSTEM AND FLAME LEVEL DETECTION METHOD

CROSS-REFERENCE TO RELATED APPLICATIONS

The present application is based on and claims priority to Japanese Application No. 2019-067097, filed Mar. 29, 2019, the entire contents of which are incorporated herein by reference.

BACKGROUND

1. Field

The present disclosure relates to a flame detection system for detecting the presence of a flame.

2. Description of the Related Art

As a flame sensor for detecting the presence of a flame in a combustion furnace, etc., an ultraviolet (UV) sensor is known. In an existing UV sensor using a discharge principle, a discharge occurs when an electrode thereof is exposed to UV rays from a flame, and a discharge current flows therein. This discharge current is integrated and converted to a voltage output, and the voltage is displayed as the flame voltage (see Japanese Unexamined Patent Application Publication No. 2005-083605). The cycle of discharge in the UV sensor depends on the frequency of the supply voltage. In a case where the frequency is 50 Hz, a discharge occurs a maximum of 50 times per second. Single discharge continues for a period of several milliseconds, and the discharge current has a pulsed waveform. Therefore, the discharge current is integrated by using a filter and converted to a voltage. Accordingly, the time constant on the rising edge of the flame voltage and the time constant on the falling edge of the flame voltage become larger.

FIG. 5 is a diagram illustrating the discharge current in a UV sensor and the waveform of the flame voltage obtained by integrating the discharge current. The time taken for the flame voltage to rise and to fall is about four to five seconds and is longer than the time from when the flame is extinct to when output is turned off (flame response). Therefore, the UV level of the flame in a normal operation can be determined, but it is not possible to grasp an abrupt change in UV rays from the flame.

A voltage to be applied to the flame sensor is generated from a commercial supply voltage. Therefore, the discharge current changes depending on the level of the supply voltage. Accordingly, when a discharge occurs 50 times per second, the flame voltage might not be constant. FIG. 6 is an example diagram illustrating the discharge current in a UV sensor and the waveform of the flame voltage in a case where the supply voltage is 100% and in a case where the supply voltage rises to 110%. In FIG. 6, the discharge current in the case where the supply voltage is 100% is indicated by I1, the discharge current in the case where the supply voltage rises to 110% is indicated by I2, the flame voltage in the case where the supply voltage is 100% is indicated by V1, and the flame voltage in the case where the supply voltage rises to 110% is indicated by V2.

SUMMARY

The present disclosure has been made in view of the above issues, and an object thereof is to provide a flame detection system and a flame level detection method having little chance of being affected by changes in the supply voltage.

A flame detection system according to an aspect of the present disclosure includes a flame sensor, an application voltage generation unit, a discharge detection unit, a discharge count unit, a discharge probability calculation unit, and a UV intensity determination unit. The flame sensor is configured to detect a UV ray generated by a flame. The application voltage generation unit is configured to cyclically apply a driving voltage to electrodes of the flame sensor. The discharge detection unit is configured to detect a discharge in the flame sensor. The discharge count unit is configured to count the number of discharges detected by the discharge detection unit. The discharge probability calculation unit is configured to calculate a discharge probability on the basis of the number of times the driving voltage is applied and the number of discharges counted by the discharge count unit. The UV intensity determination unit is configured to determine an intensity level of the UV ray on the basis of the discharge probability.

In the flame detection system according to one example configuration, the discharge probability calculation unit calculates the discharge probability by dividing the number of discharges by the number of times the driving voltage is applied.

In the flame detection system according to one example configuration, the discharge probability calculation unit assumes the number of discharges per unit time as the discharge probability.

The flame detection system according to one example configuration further includes a determination result output unit configured to output a result of determination by the UV intensity determination unit.

A flame level detection method for a flame detection system according to an aspect of the present disclosure includes: a first step of cyclically applying a driving voltage to electrodes of a flame sensor configured to detect a UV ray generated by a flame; a second step of detecting a discharge in the flame sensor; a third step of calculating a discharge probability on the basis of the number of times the driving voltage is applied and the number of discharges detected in the second step; and a fourth step of determining an intensity level of the UV ray on the basis of the discharge probability.

According to the aspects of the present disclosure, an abrupt change in UV rays from a flame can be grasped by calculating the discharge probability. Further, the flame level can be determined with little chance of being affected by changes in the supply voltage.

DETAILED DESCRIPTION

Principle of Present Disclosure

Figure 1:
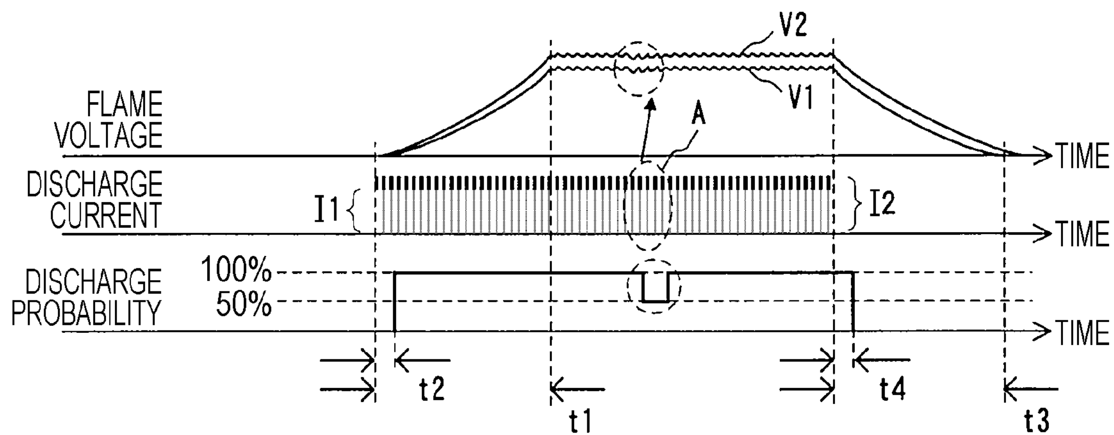
FIG. 1 is a diagram for explaining the principle of the present disclosure.
Figure 6:
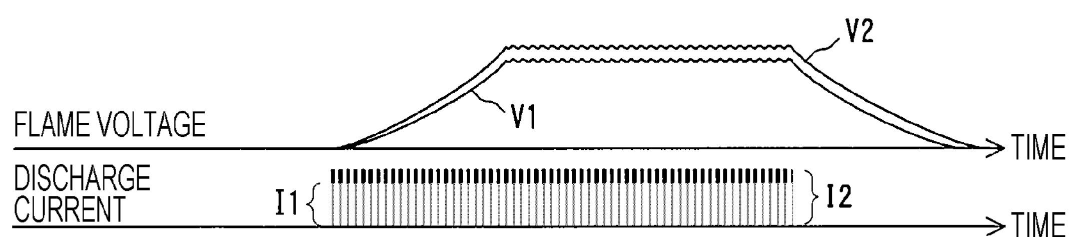
FIG. 6 is a diagram illustrating the discharge current of a UV sensor and the waveform of the flame voltage in a case where the supply voltage is 100% and in a case where the supply voltage rises to 110%.

The present disclosure pays attention to the discharge probability of a UV sensor. Specifically, the number of discharges per unit time is counted to obtain the discharge probability. FIG. 1 is a diagram for explaining the principle of the present disclosure and illustrates the discharge current in a UV sensor and the waveform of the flame voltage in a case where the supply voltage is 100% and in a case where the supply voltage rises to 110%. As in FIG. 6, the discharge current in the case where the supply voltage is 100% is indicated by I1, the discharge current in the case where the supply voltage rises to 110% is indicated by I2, the flame voltage in the case where the supply voltage is 100% is indicated by V1, and the flame voltage in the case where the supply voltage rises to 110% is indicated by V2.

Based on the driving principle of the UV sensor, for example, there are 50 opportunities for discharge per second in a case where the frequency of the supply voltage is 50 Hz and 60 opportunities for discharge per second in a case where the frequency of the supply voltage is 60 Hz. Here, it is assumed that there are 50 opportunities for discharge per second and that the UV sensor discharges each time there is an opportunity for discharge. Then, the discharge probability per second is 100% (50/50=100). When it is assumed that the UV sensor discharges 25 times, the discharge probability per second is 50% (25/50=50). That is, when the number of opportunities for discharge per second is represented by N and the number of discharges per second is represented by n, the discharge probability P per second is expressed by the following expression.

$$P=n/N\times 100 \quad (1)$$

The discharge probability P is used as a parameter for monitoring the output of the UV sensor instead of the flame voltage. In the related art, the flame voltage is obtained by integrating the discharge current using an integration circuit. Therefore, with the related-art method for monitoring the flame voltage, it is difficult to see a change in discharge. For example, in the example in FIG. 1, a decrease in the number of discharges is observed in area A; however, it is difficult to see this change from the flame voltage. As illustrated in FIG. 1, the flame voltage is affected also by changes in the supply voltage, and therefore, it is difficult to determine whether a change in the flame voltage is caused by a change in discharge or a change in the supply voltage.

On the other hand, the case of using the discharge probability P is not affected by changes in the supply voltage, and therefore, a pure discharge state is reflected, and a slight change in discharge can be detected.

Further, as described above, the time constant on the rising edge of the flame voltage is large, and therefore, it takes several seconds (t1 in FIG. 1) for the flame voltage to change. On the other hand, the discharge probability P rises with only a delay per unit time (t2 in FIG. 1), and therefore, highly responsive ignition detection is possible.

Similarly, the time constant on the falling edge of the flame voltage is large, the flame voltage does not drop for several seconds despite extinction, and it takes several seconds (t3 in FIG. 1) for the flame voltage to change. On the other hand, the discharge probability P falls to 0% with only a delay per unit time (t4 in FIG. 1), and therefore, responsiveness increases.

Accordingly, with the present disclosure, the flame level can be checked in a highly responsive manner, and a slight change in a flame and in the output of the UV sensor can be grasped. Further, with the present disclosure, the state of the UV sensor and the state of a flame can be checked with little chance of being affected by changes in the supply voltage.

Embodiment

Figure 2:
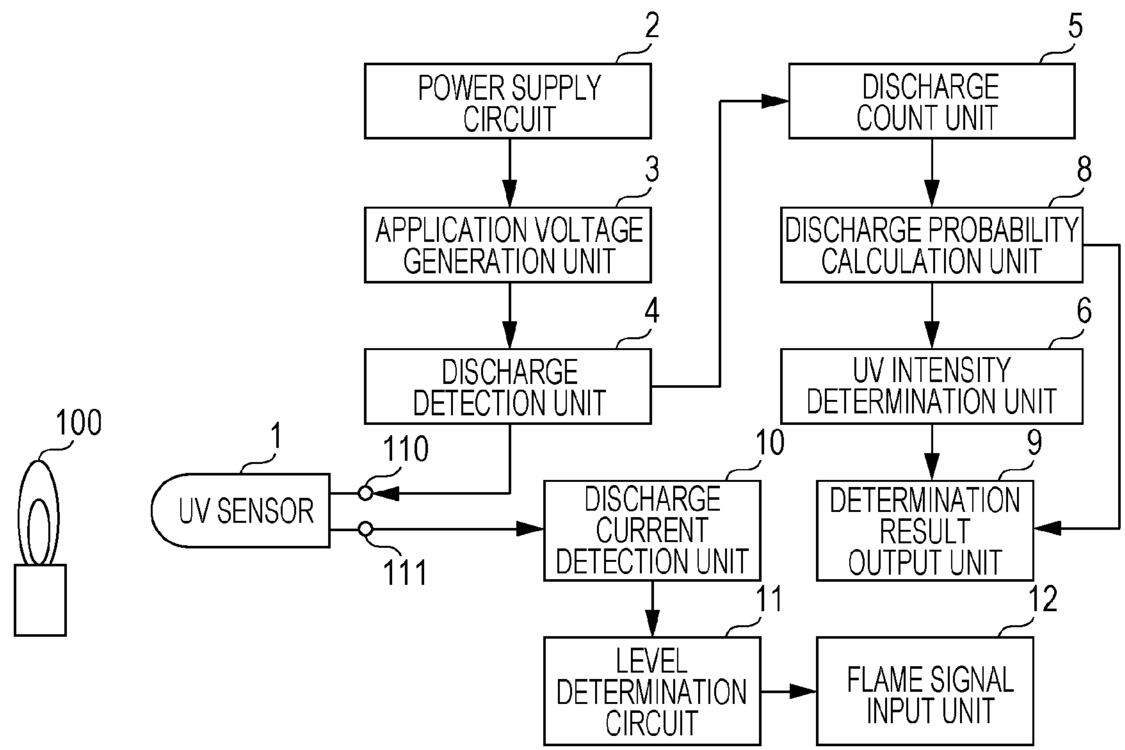
FIG. 2 is a block diagram illustrating a configuration of a flame detection system according to an embodiment of the present disclosure.

Hereinafter, an embodiment of the present disclosure will be described with reference to the drawings. FIG. 2 is a block diagram illustrating a configuration of a flame detection system according to the embodiment of the present disclosure. The flame detection system includes a UV sensor 1 (UV phototube), a power supply circuit 2, an application voltage generation unit 3, a discharge detection unit 4, a discharge count unit 5, a discharge probability calculation unit 8, a UV intensity determination unit 6, a determination result output unit 9, a discharge current detection unit 10, a level determination circuit 11, and a flame signal input unit 12. The UV sensor 1 serves as a flame sensor that detects light (UV rays) generated by a flame 100. The power supply circuit 2 supplies a supply voltage. The application voltage generation unit 3 cyclically applies a driving voltage to the pair of electrodes of the UV sensor 1. The discharge detection unit 4 detects a discharge in the UV sensor 1. The discharge count unit 5 counts the number of discharges detected by the discharge detection unit 4. The discharge probability calculation unit 8 calculates the discharge probability of the UV sensor 1 on the basis of the number of discharges counted by the discharge count unit 5 and the discharge opportunities. The UV intensity determination unit 6 determines the UV intensity on the basis of the discharge probability obtained by the discharge probability calculation unit 8. The determination result output unit 9 outputs the UV intensity determined by the UV intensity determination unit 6. The discharge current detection unit 10 detects the discharge current in the UV sensor 1. The level determination circuit 11 determines the level of the discharge current detected by the discharge current detection unit 10. The flame signal input unit 12 inputs a value determined by the level determination circuit 11 as a flame signal.

Figure 3:
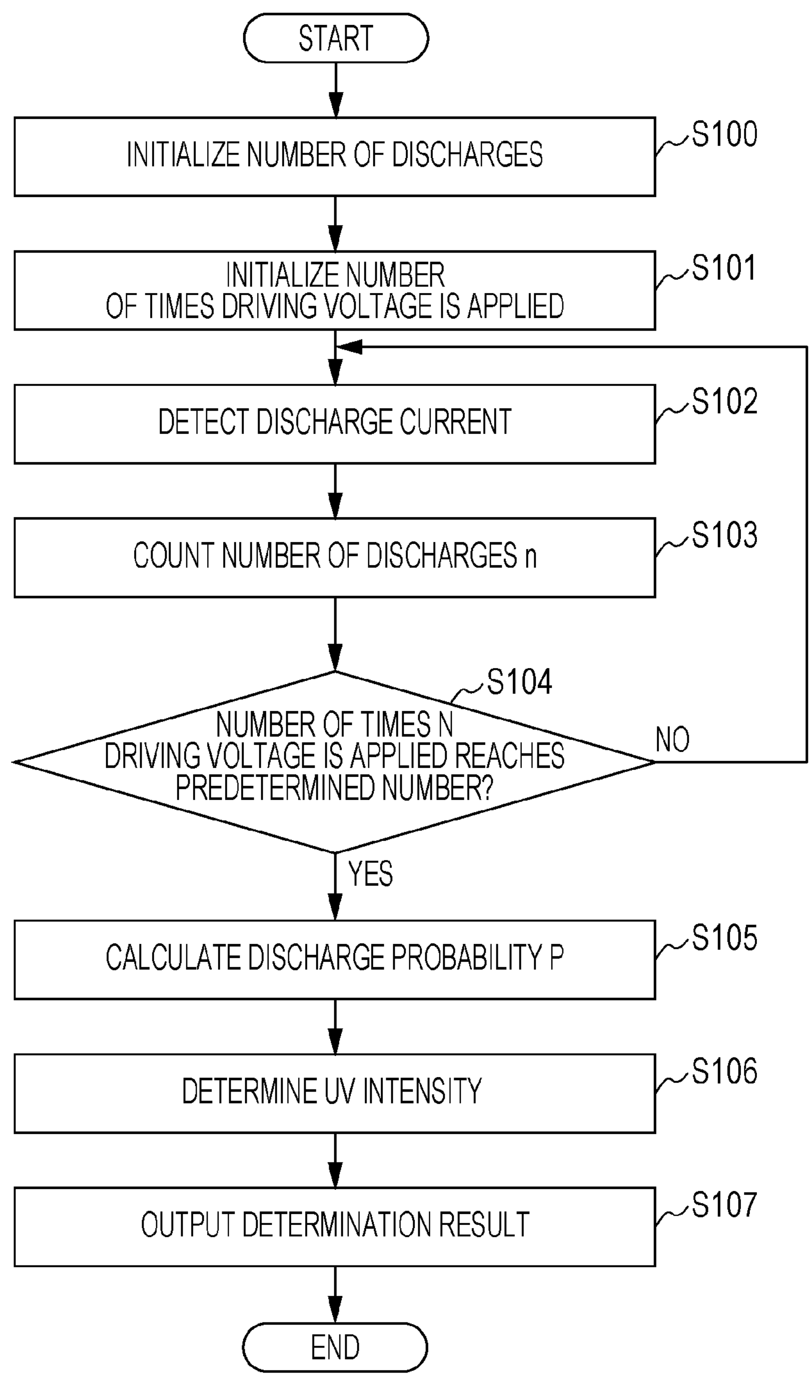
FIG. 3 is a flowchart for explaining operations of the flame detection system according to the embodiment of the present disclosure.

FIG. 3 is a flowchart for explaining operations of the flame detection system according to the embodiment. The UV sensor 1 is a phototube constituted by a tubular envelope having both ends closed, two electrode pins that pass through the envelope, and two electrodes supported in parallel to each other within the envelope by the electrode pins. In the UV sensor 1 configured as described above, when one of the electrodes disposed so as to face the flame 100 is irradiated with UV rays in a state where a predetermined voltage is applied between the electrodes via the electrode supporting pins, electrons are released from the electrode due to the photoelectric effect and a discharge current flows between the electrodes.

The power supply circuit 2 supplies to the application voltage generation unit 3 a commercial supply voltage externally input thereto. At the start of a flame detection operation, the discharge count unit 5 initializes the number of discharges n to zero (step S100 in FIG. 3), and the discharge probability calculation unit 8 initializes N, which is the number of times the driving voltage is applied, to zero (step S101 in FIG. 3).

The application voltage generation unit 3 increases the AC voltage supplied from the power supply circuit 2 to a predetermined value and applies the increased voltage between a pair of terminals 110 and 111 of the UV sensor 1.

The discharge detection unit 4 detects the discharge current that flows in the UV sensor 1. For example, a light-emitting diode and a phototransistor are provided in the discharge detection unit 4. The light-emitting diode is driven by the discharge current flowing in the UV sensor 1 to emit light, and the light is detected via the phototransistor (step S102 in FIG. 3).

In a case where the discharge current is detected by the discharge detection unit 4, the discharge count unit 5 increments the number of discharges n by one (step S103 in FIG. 3).

The process in step S102 and step S103 is repeatedly performed. In a case where N, which is the number of times the driving voltage is applied (discharge opportunities), reaches a predetermined number Nth (for example, 50 in the embodiment) (YES in step S104 in FIG. 3), the discharge probability calculation unit 8 calculates the discharge probability P by using expression (1) (step S105 in FIG. 3).

The UV intensity determination unit 6 determines the discharge probability P calculated by the discharge probability calculation unit 8 to be the UV intensity (step S106 in FIG. 3).

The determination result output unit 9 externally outputs the result of determination by the UV intensity determination unit 6 (step S107 in FIG. 3). As the method for outputting the determination result, a method is possible in which, for example, the determination result is displayed or the determination result is externally read via communication.

The flame detection system needs to periodically perform the process from step S100 to step S107 and to repeatedly perform the process from step S105 to step S107 for a determination period (a period during which N, which is the number of times the driving voltage is applied, is from 0 to Nth).

Accordingly, with the embodiment, the discharge probability P is calculated so that a slight change in the flame 100 can be grasped.

In a case where UV rays generated by a flame are detected for use in combustion control, the discharge current detection unit 10, the level determination circuit 11, and the flame signal input unit 12 are provided. The discharge current detection unit 10 detects the discharge current in the UV sensor 1, and the level determination circuit 11 compares the discharge current detected by the discharge current detection unit 10 with a threshold to determine the presence of a flame and outputs the result of determination to the flame signal input unit 12.

In the embodiment, the discharge probability P is calculated by using expression (1); however, the discharge probability calculation unit 8 may assume the number of discharges per unit time as the discharge probability P. In this case, the number of discharges n at the time when the unit time elapsed at step S104 is assumed as the discharge probability P (step S105).

Figure 4:
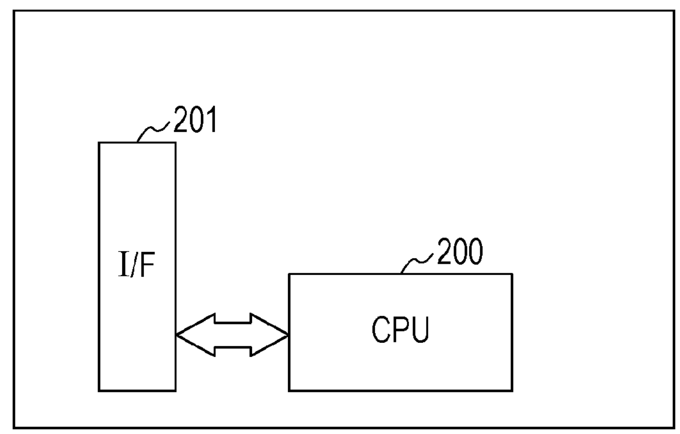
FIG. 4 is a block diagram illustrating an example configuration of a computer for implementing the flame detection system according to the embodiment of the present disclosure.
Figure 5:
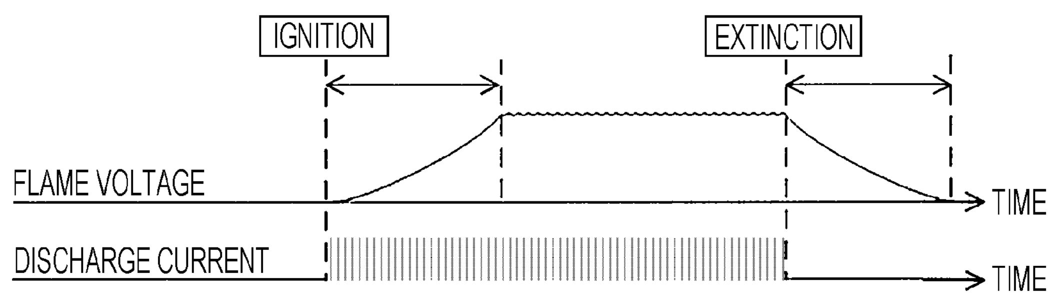
FIG. 5 is a diagram illustrating the discharge current of a UV sensor and the waveform of the flame voltage.

The discharge count unit 5, the discharge probability calculation unit 8, the UV intensity determination unit 6, and the determination result output unit 9 described in the embodiment can be implemented by using a computer including a central processing unit (CPU) and an interface and a program that controls these hardware resources. An example configuration of this computer is illustrated in FIG. 4. The computer includes a CPU 200 and an interface device (hereinafter abbreviated as I/F) 201. To the I/F 201, the discharge detection unit 4 (discharge detection circuit), the determination result output unit 9 (communication circuit or display circuit), etc. are connected. In the computer configured as described above, the program for implementing the flame level detection method of the present disclosure is stored in a built-in memory of the CPU 200. The CPU 200 performs the processes described in the embodiment in accordance with the program stored in the memory.

The present disclosure is applicable to a flame detection system.

What is claimed is:

1. A flame detection system, comprising:
- a flame sensor configured to detect a UV ray generated by a flame;
- an application voltage generation circuit configured to cyclically apply a driving voltage to electrodes of the flame sensor;
- a discharge detection circuit configured to detect a discharge in the flame sensor; and
- processing circuitry configured to
  - count a number of discharges detected by the discharge detection circuit,
  - calculate a discharge probability based on a number of times the driving voltage is applied and the counted number of discharges, and
  - determine an intensity level of the UV ray based on the calculated discharge probability.

2. The flame detection system according to claim 1, wherein the processing circuitry is further configured to calculate the discharge probability by dividing the counted number of discharges by the number of times the driving voltage is applied.

3. The flame detection system according to claim 1, wherein the processing circuitry is further configured to determine a number of discharges per unit time as the discharge probability.

4. The flame detection system according to claim 1, wherein the processing circuitry is further configured to output the determined intensity level of the UV ray.

5. The flame detection system of claim 1, wherein the discharge detection circuit includes a light emitting diode and a phototransistor.

6. A flame level detection method for a flame detection system, the method comprising:
- cyclically applying a driving voltage to electrodes of a flame sensor configured to detect a UV ray generated by a flame;
- detecting a discharge in the flame sensor;
- calculating a discharge probability based on a number of times the driving voltage is applied and a number of discharges detected in the detecting step; and
- determining an intensity level of the UV ray based on the discharge probability.

7. The flame level detection method for a flame detection system according to claim 6, wherein the calculating step includes calculating the discharge probability by dividing the number of discharges by the number of times the driving voltage is applied.

8. The flame level detection method for a flame detection system according to claim 6, wherein the calculating step includes determining a number of discharges per unit time as the discharge probability.

9. The flame level detection method for a flame detection system according to claim 6, the method further comprising outputting the intensity level of the UV ray determined in the determining step.

* * * * *